US012761509B2

(12) United States Patent

Chen et al.

(10) Patent No.: US 12,761,509 B2
(45) Date of Patent: Oct. 13, 2026

(54) CHOLESTERIC LIQUID CRYSTAL DISPLAY DEVICE AND DRIVING METHOD THEREOF

(71) Applicant: GENETOUCH CORP., Taoyuan City (TW)

(72) Inventors: Cheng-Yu Chen, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/319,461

(22) Filed: Sep. 4, 2025

(65) Prior Publication Data

US 2026/0072301 A1 Mar. 12, 2026

(30) Foreign Application Priority Data

Sep. 12, 2024 (TW) ................................ 113134678

(51) Int. Cl.
*G02F 1/133* (2006.01)
*G09G 3/36* (2006.01)

(52) U.S. Cl.
CPC ....... *G02F 1/13306* (2013.01); *G09G 3/3607* (2013.01); *G09G 3/3611* (2013.01); *G09G 2320/0233* (2013.01)

(58) Field of Classification Search
CPC .............. G02F 1/13306; G09G 3/3607; G09G 3/3611; G09G 2320/0233
See application file for complete search history.

(56) References Cited

U.S. PATENT DOCUMENTS

2003/0085858 A1* 5/2003 Okafuji ................ G09G 3/3692 345/87
2021/0358447 A1* 11/2021 Liu ...................... G09G 3/2007
2023/0185121 A1* 6/2023 Lin ..................... G02F 1/13718 349/33

* cited by examiner

*Primary Examiner* — Kenneth B Lee, Jr.
(74) *Attorney, Agent, or Firm* — RABIN & BERDO, P.C.

(57) ABSTRACT

The present invention provides a driving method of a cholesteric liquid crystal display (ChLCD) device, including: generating row and column driving signals respectively to the Y lines of the row circuit structures and the X lines of the column circuit structures of the ChLCD panel; wherein the row driving signals include addressing and non-addressing signals; wherein the ChLCD panel includes multiple uneven and even pixels; after the liquid crystal driving unit outputs the addressing signals to the Y-th row circuit structure, the liquid crystal driving unit outputs the non-addressing signal at least M times to the row circuit structure where the uneven pixels are located, to even out the reflectivity of the uneven pixels; and the liquid crystal driving unit outputs Hi-Z voltage signal M times to the row circuit structure of the even pixels, to maintain the reflectivity of the even pixels.

10 Claims, 5 Drawing Sheets

| | Frame 1 | Frame 2 | Frame 3 | Frame 4 | Frame 5 | Frame 6 | Frame 7 | Frame 8 | Frame 9 | Frame 10 | Frame 11 | Frame 12 | Frame 13 | Frame 14 | Frame 15 | Frame 16 | Frame 17 | Frame 18 | Frame 19 | Frame 20 |
|---|---|---|---|---|---|---|---|---|---|---|---|---|---|---|---|---|---|---|---|---|
| 1 | D | NA | NA | NA | NA | NA | NA | NA | NA | NA | NA | NA | NA | NA | NA | NA | Hi-Z | Hi-Z | Hi-Z | Hi-Z |
| 2 | NA | D | NA | NA | NA | NA | NA | NA | NA | NA | NA | NA | NA | NA | NA | NA | Hi-Z | Hi-Z | Hi-Z | Hi-Z |
| 3 | NA | NA | D | NA | NA | NA | NA | NA | NA | NA | NA | NA | NA | NA | NA | NA | Hi-Z | Hi-Z | Hi-Z | Hi-Z |
| 4 | NA | NA | NA | D | NA | NA | NA | NA | NA | NA | NA | NA | NA | NA | NA | NA | Hi-Z | Hi-Z | Hi-Z | Hi-Z |
| 5 | NA | NA | NA | NA | D | NA | NA | NA | NA | NA | NA | NA | NA | NA | NA | NA | Hi-Z | Hi-Z | Hi-Z | Hi-Z |
| 6 | NA | NA | NA | NA | NA | D | NA | NA | NA | NA | NA | NA | NA | NA | NA | NA | Hi-Z | Hi-Z | Hi-Z | Hi-Z |
| 7 | NA | NA | NA | NA | NA | NA | D | NA | NA | NA | NA | NA | NA | NA | NA | NA | Hi-Z | Hi-Z | Hi-Z | Hi-Z |
| 8 | NA | NA | NA | NA | NA | NA | NA | D | NA | NA | NA | NA | NA | NA | NA | NA | Hi-Z | Hi-Z | Hi-Z | Hi-Z |
| 9 | NA | NA | NA | NA | NA | NA | NA | NA | D | NA | NA | NA | NA | NA | NA | NA | Hi-Z | Hi-Z | Hi-Z | Hi-Z |
| 10 | NA | NA | NA | NA | NA | NA | NA | NA | NA | D | NA | NA | NA | NA | NA | NA | Hi-Z | Hi-Z | Hi-Z | Hi-Z |
| 11 | NA | NA | NA | NA | NA | NA | NA | NA | NA | NA | D | NA | NA | NA | NA | NA | Hi-Z | Hi-Z | Hi-Z | Hi-Z |
| 12 | NA | NA | NA | NA | NA | NA | NA | NA | NA | NA | NA | D | NA | NA | NA | NA | Hi-Z | Hi-Z | Hi-Z | Hi-Z |
| 13 | NA | NA | NA | NA | NA | NA | NA | NA | NA | NA | NA | NA | D | NA | NA | NA | NA | NA | NA | NA |
| 14 | NA | NA | NA | NA | NA | NA | NA | NA | NA | NA | NA | NA | NA | D | NA | NA | NA | NA | NA | NA |
| 15 | NA | NA | NA | NA | NA | NA | NA | NA | NA | NA | NA | NA | NA | NA | D | NA | NA | NA | NA | NA |
| 16 | NA | NA | NA | NA | NA | NA | NA | NA | NA | NA | NA | NA | NA | NA | NA | D | NA | NA | NA | NA |

FIG.3

| | Frame 1 | Frame 2 | Frame 3 | Frame 4 | Frame 5 | Frame 6 | Frame 7 | Frame 8 | Frame 9 | Frame 10 | Frame 11 | Frame 12 | Frame 13 | Frame 14 | Frame 15 | Frame 16 | Frame 17 | Frame 18 | Frame 19 | Frame 20 |
|---|---|---|---|---|---|---|---|---|---|---|---|---|---|---|---|---|---|---|---|---|
| 1 | D | NA | NA | NA | NA | Hi-Z | Hi-Z | Hi-Z | Hi-Z | Hi-Z | Hi-Z | Hi-Z | Hi-Z | Hi-Z | Hi-Z | Hi-Z | Hi-Z | Hi-Z | Hi-Z | Hi-Z |
| 2 | NA | D | NA | NA | NA | NA | Hi-Z | Hi-Z | Hi-Z | Hi-Z | Hi-Z | Hi-Z | Hi-Z | Hi-Z | Hi-Z | Hi-Z | Hi-Z | Hi-Z | Hi-Z | Hi-Z |
| 3 | NA | NA | D | NA | NA | NA | NA | Hi-Z | Hi-Z | Hi-Z | Hi-Z | Hi-Z | Hi-Z | Hi-Z | Hi-Z | Hi-Z | Hi-Z | Hi-Z | Hi-Z | Hi-Z |
| 4 | NA | NA | NA | D | NA | NA | NA | NA | Hi-Z | Hi-Z | Hi-Z | Hi-Z | Hi-Z | Hi-Z | Hi-Z | Hi-Z | Hi-Z | Hi-Z | Hi-Z | Hi-Z |
| 5 | NA | NA | NA | NA | D | NA | NA | NA | NA | Hi-Z | Hi-Z | Hi-Z | Hi-Z | Hi-Z | Hi-Z | Hi-Z | Hi-Z | Hi-Z | Hi-Z | Hi-Z |
| 6 | NA | NA | NA | NA | NA | D | NA | NA | NA | NA | Hi-Z | Hi-Z | Hi-Z | Hi-Z | Hi-Z | Hi-Z | Hi-Z | Hi-Z | Hi-Z | Hi-Z |
| 7 | NA | NA | NA | NA | NA | NA | D | NA | NA | NA | NA | Hi-Z | Hi-Z | Hi-Z | Hi-Z | Hi-Z | Hi-Z | Hi-Z | Hi-Z | Hi-Z |
| 8 | NA | NA | NA | NA | NA | NA | NA | D | NA | NA | NA | NA | Hi-Z | Hi-Z | Hi-Z | Hi-Z | Hi-Z | Hi-Z | Hi-Z | Hi-Z |
| 9 | NA | NA | NA | NA | NA | NA | NA | NA | D | NA | NA | NA | NA | Hi-Z | Hi-Z | Hi-Z | Hi-Z | Hi-Z | Hi-Z | Hi-Z |
| 10 | NA | NA | NA | NA | NA | NA | NA | NA | NA | D | NA | NA | NA | NA | Hi-Z | Hi-Z | Hi-Z | Hi-Z | Hi-Z | Hi-Z |
| 11 | NA | NA | NA | NA | NA | NA | NA | NA | NA | NA | D | NA | NA | NA | NA | Hi-Z | Hi-Z | Hi-Z | Hi-Z | Hi-Z |
| 12 | NA | NA | NA | NA | NA | NA | NA | NA | NA | NA | NA | D | NA | NA | NA | NA | Hi-Z | Hi-Z | Hi-Z | Hi-Z |
| 13 | NA | NA | NA | NA | NA | NA | NA | NA | NA | NA | NA | NA | D | NA | NA | NA | NA | Hi-Z | Hi-Z | Hi-Z |
| 14 | NA | NA | NA | NA | NA | NA | NA | NA | NA | NA | NA | NA | NA | D | NA | NA | NA | NA | Hi-Z | Hi-Z |
| 15 | NA | NA | NA | NA | NA | NA | NA | NA | NA | NA | NA | NA | NA | NA | D | NA | NA | NA | NA | Hi-Z |
| 16 | NA | NA | NA | NA | NA | NA | NA | NA | NA | NA | NA | NA | NA | NA | NA | D | NA | NA | NA | NA |

FIG.4

CHOLESTERIC LIQUID CRYSTAL DISPLAY DEVICE AND DRIVING METHOD THEREOF

CROSS-REFERENCE TO RELATED APPLICATION(S)

This application claims the priority benefit of TW application serial No. 113134678 filed on Sep. 12, 2024, the entirety of which is hereby incorporated by reference herein and made a part of the specification.

BACKGROUND OF THE INVENTION

1. Field of the Invention

The present invention is related to a device and a driving method thereof, especially related to a cholesteric liquid crystal display device and a driving method thereof.

2. Description of the Related Art

With reference to FIG. 5, FIG. 5 is a structural diagram of a conventional cholesteric liquid crystal display (ChLCD) 2. The conventional ChLCD 2 includes a ChLCD panel 20, and the ChLCD panel 20 is a passive matrix made up of multiple column circuit structures 21 and row circuit structures 22. The column circuit structures 21 are used as data lines, and the row circuit structures 22 are used as scan lines. As shown in FIG. 5, the ChLCD panel 20 includes X lines of column circuit structures 21 and Y lines of row circuit structures 22. For driving the ChLCD 2, the column circuit structures 21 and the row circuit structures 22 are electrically connected to a liquid crystal driving unit 23. The liquid crystal driving unit 23 outputs column driving voltages to the multiple column circuit structures 21, and sequentially outputs row driving voltages to the multiple row circuit structures 22 by scanning. The row driving voltages include an addressing voltage and a non-addressing voltage. As shown in FIG. 5, the addressing voltage of the row driving voltages scans from the first row circuit structure 22, the second row circuit structure 22, the (Y-1)-th row circuit structure 22, and to the Y-th row circuit structure 22 in order.

As mentioned above, the ChLCD panel 20 is driven by scanning from the first row circuit structure 22 to the last row circuit structure 22 sequentially. In addition, a row scan time is consumed when each row circuit structure 22 is scanned. However, the row circuit structure 22 scanned later with the addressing signal has a shorter accumulated duration of the non-addressing signal. The shorter accumulated duration of the non-addressing signal will lead to differences in energy accumulation on the cholesteric liquid crystals, and further causes inconsistent switching of the cholesteric liquid crystals. In other words, the differences of energy accumulation on the cholesteric liquid crystals cause inconsistent switching, therefore causing uneven reflectivity on the pixels, and further causing a problem of a higher pixel reflectivity of the ChLCD display 2.

Thus, it has become an issue on how to provide a driving method of the ChLCD device.

SUMMARY OF THE INVENTION

The present invention provides a driving method of a cholesteric liquid crystal display device, and the driving method includes steps of:

- generating column driving signals and row driving signals, outputting the column driving signals to X column circuit structures of a cholesteric liquid crystal display (ChLCD) panel, and outputting row driving signals to the Y row circuit structures of the ChLCD panel by a liquid crystal driving unit; wherein each intersection crossed by each row circuit structure and each column circuit structure forms a respective pixel; wherein the row driving signals include addressing signals and non-addressing signals; wherein, the ChLCD panel includes multiple uneven pixels and multiple even pixels;
- outputting the non-addressing signals at most M times to the row circuit structures of the uneven pixels by the liquid crystal driving unit to even out reflectivity of the uneven pixels after outputting the addressing signals to the Y-th row circuit structure by the liquid crystal driving unit; wherein, M is an integer greater than or equal to 1; and
- outputting high-impedance (Hi-Z) voltage signals M times to the row circuit structures of the even pixels to maintain the reflectivity of the even pixels by the liquid crystal driving unit after outputting the addressing signals to the Y-th row circuit structure by the liquid crystal driving unit.

The present invention further provides a cholesteric liquid crystal display device, including a cholesteric liquid crystal display panel, a liquid crystal driving unit, and a signal processing unit.

The ChLCD panel includes X lines of column circuit structures and Y lines of row circuit structures, wherein each intersection crossed by each row circuit structure and each column circuit structure forms a respective pixel.

The liquid crystal driving unit is connected to the ChLCD panel, generating column driving signals and row driving signals, outputting the column driving signals to the X column circuit structures of the ChLCD panel, and outputting the row driving signals to the Y row circuit structures of the ChLCD panel. The row driving signals comprise addressing and non-addressing signals.

The signal processing unit is connected to the row circuit structure and the column circuit structure of the ChLCD, and the liquid crystal driving unit. The liquid crystal driving unit outputs the non-addressing signals at most M times to the row circuit structures of the uneven pixels to even out the reflectivity of the uneven pixels after the liquid crystal driving unit outputs the addressing signals to the Y-th row circuit structure, and M is an integer greater than or equal to 1. In contrast, the liquid crystal driving unit outputs high-impedance (Hi-Z) voltage signals M times to the row circuit structures of the even pixels to maintain the reflectivity of the even pixels after the liquid crystal driving unit outputs the addressing signals to the Y-th row circuit structure.

Based on the above, the cholesteric liquid crystal device and the driving method thereof can adjust a number of times for outputting the non-addressing signals to the row circuit structures based on a precision requirement of the ChLCD device, such as depending on an error value of the reflectivity of the pixels. The cholesteric liquid crystal device and the driving method thereof can also adjust the number of times for outputting the non-addressing signals and the Hi-Z voltage signals to the row circuit structures to even out the reflectivity of the pixels on the ChLCD panel.

BRIEF DESCRIPTION OF THE DRAWINGS

FIG. 3 is a schematic diagram of a row driving signal of a first embodiment of the driving method of the cholesteric liquid crystal display device of the present invention.

FIG. 4 is a schematic diagram of the row driving signal of a second embodiment of the driving method of the cholesteric liquid crystal display device of the present invention.

DETAILED DESCRIPTION OF THE INVENTION

Figure 1:
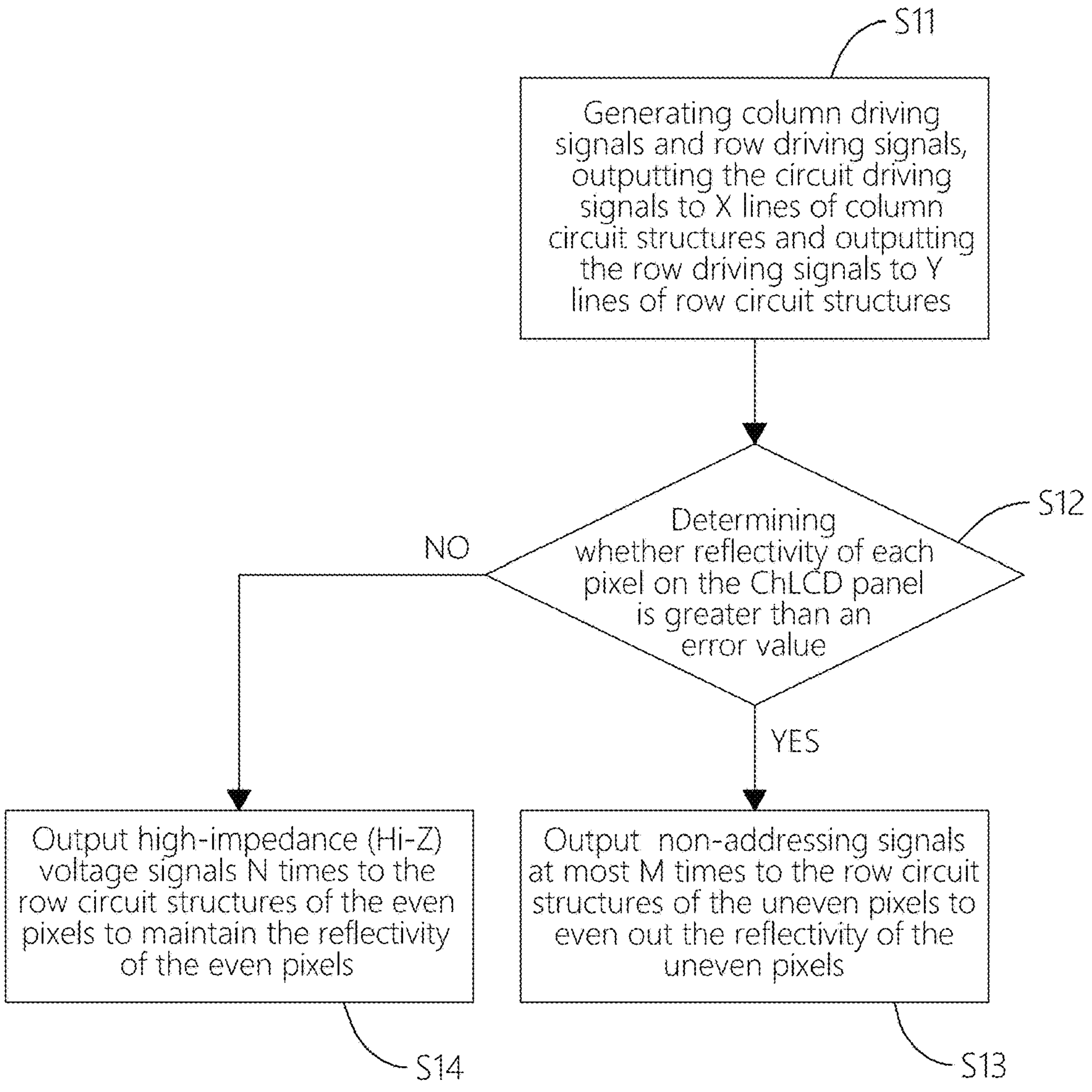
FIG. 1 is a flow diagram of one embodiment of a driving method of a cholesteric liquid crystal display device of the present invention.

In one embodiment, with reference to FIG. 1, FIG. 1 is a flow diagram of a driving method of a cholesteric liquid crystal display (ChLCD) device of the present invention. The driving method of the cholesteric liquid crystal display device includes steps as follows.

In step S11, generating column driving signals and row driving signals, outputting the circuit driving signals to X lines of column circuit structures and outputting the row driving signals to Y lines of row circuit structures by a liquid crystal driving unit of the ChLCD device. X and Y are integers greater than or equal to 1, and each intersection crossed by each column circuit structure and each row circuit structure forms a respective pixel. Moreover, a ChLCD panel of the ChLCD device includes multiple uneven pixels and multiple even pixels. The row driving signals are known as scan driving signals, and the column driving signals are known as data driving signals. The row driving signals include addressing and non-addressing signals.

In one embodiment, the uneven pixels and the even pixels can be preset by a manufacturer of the ChLCD device. In another embodiment, the uneven pixels and the even pixels can be determined by a signal processing unit of the ChLCD device. For example, in step S12, determining whether reflectivity of each pixel on the ChLCD panel is greater than an error value by the signal processing unit. The signal processing unit sets reflectivity of the pixels greater than the error value as uneven pixels, and sets the reflectivity of the pixels less than the error values as even pixels.

In step S13, output the non-addressing signals at most M times to the row circuit structures of the uneven pixels to even out the reflectivity of the uneven pixels by the liquid crystal driving unit after the liquid crystal driving unit outputs the addressing signals to the Y-th row circuit structure. M is an integer greater than or equal to 1.

In step S14, output a high-impedance (Hi-Z) voltage signals N times to the row circuit structures of the even pixels to maintain the reflectivity of the even pixels by the liquid crystal driving unit after the liquid crystal driving unit outputs the addressing signals to the Y-th row circuit structure. N is an integer greater than or equal to 1.

Figure 2:
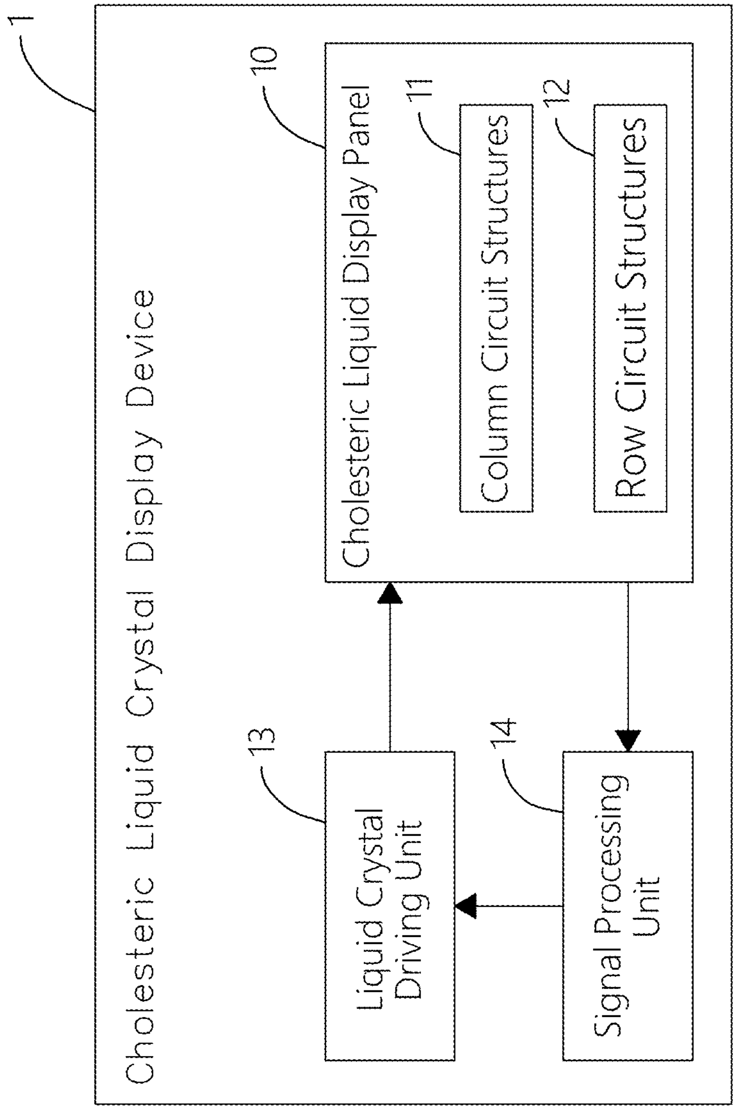
FIG. 2 is a block diagram of the cholesteric liquid crystal display device of the present invention.
Figure 5:
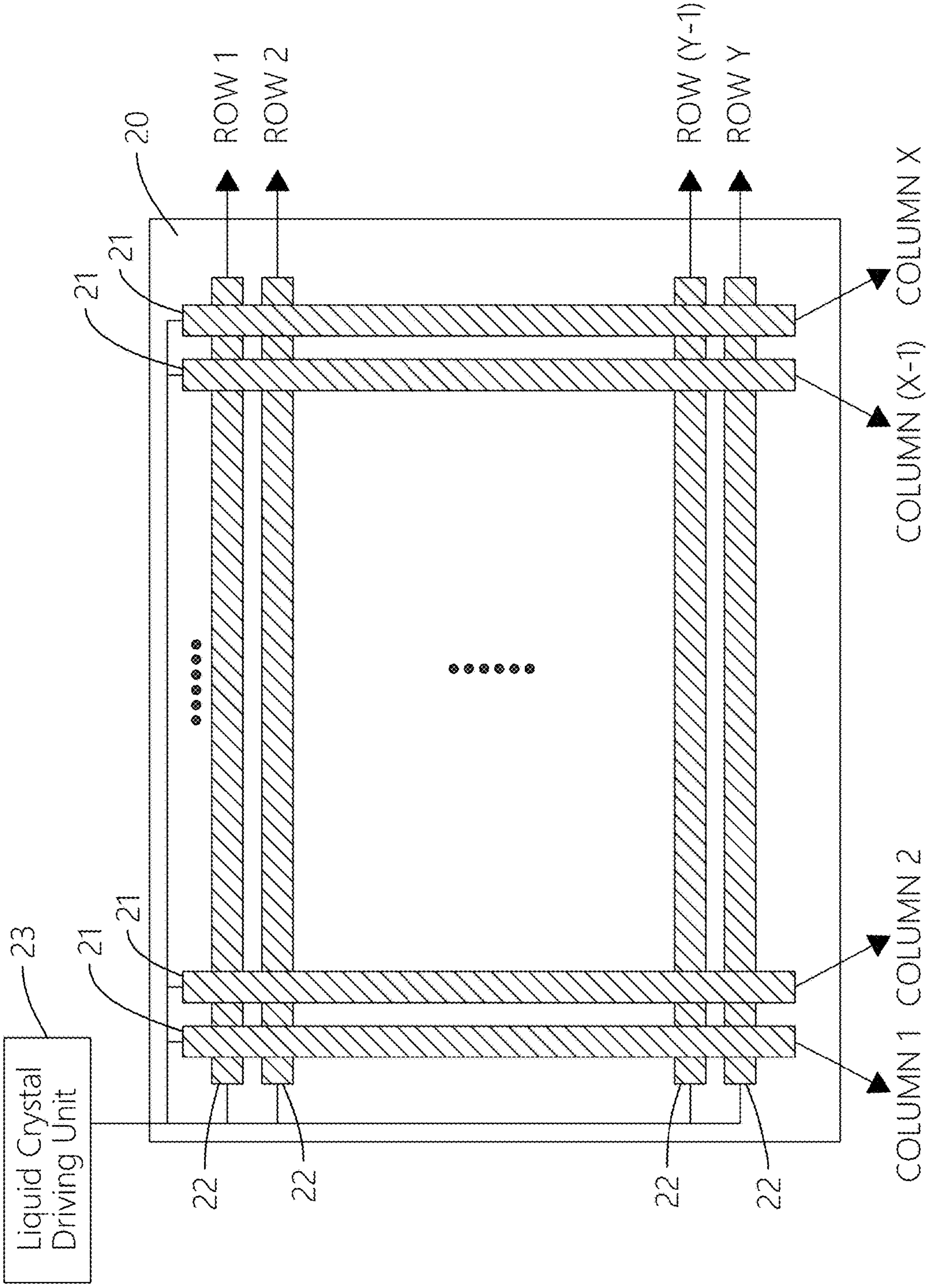
FIG. 5 is a structural diagram of a conventional cholesteric liquid crystal display panel.

With reference to FIG. 2, FIG. 2 is a block diagram of the cholesteric liquid crystal display device of the present invention. The ChLCD device 1 includes a ChLCD panel 10, a liquid crystal driving unit 13, and a signal processing unit 14. The ChLCD panel 10 includes X lines of column circuit structures 11 and Y lines of row circuit structures 12, and each intersection crossed by each column circuit structure 11 and each row circuit structure 12 forms a respective pixel. The liquid crystal driving unit 13 is connected to the ChLCD panel 10 and generates row driving signals and column driving signals. The liquid crystal driving unit 13 then outputs the column driving signals to the X lines of the column circuit structures and outputs the row driving signals to the Y lines of the row circuit structures 12 of the ChLCD panel 10. Furthermore, the liquid crystal driving unit 13 scans from the first to the Y-th row circuit structures 12 sequentially, and the row driving signals include addressing signals and non-addressing signals. Moreover, the ChLCD panel 10 includes multiple uneven pixels and multiple even pixels.

After the scanning of the ChLCD panel 10 is completed, the liquid crystal driving unit 13 further applies N times of a row scan time with the non-addressing signal to the N rows of the row circuit structures, and further applies the row driving signals to the row circuit structures and the column driving signals to the column circuit structures for compensation. Therefore, all cholesteric liquid crystals of the ChLCD panel 10 can obtain enough energy to switch states, in order to even out an image displayed by the cholesteric liquid crystals.

How to apply the row driving signals to the row circuit structures and the column driving signals to the column circuit structures for compensation will be discussed in further embodiments.

In one embodiment, the distinction between the uneven pixels and the even pixels is preset by the manufacturer of the ChLCD device 1. After the scanning of the ChLCD panel 10 is completed, if the pixel receives non-addressing signals less than M times, the pixel is considered as an uneven pixel; if the pixel receives non-addressing signals more than M times, the pixel is considered as an even pixel. M is a fixed number and an integer greater than or equal to 1.

In another embodiment, the signal processing unit 14 is connected to the column circuit structures 11, the row circuit structures 12, and the liquid crystal driving unit 13 of the ChLCD panel 10. The signal processing unit 14 determines whether the reflectivity of each pixel on the ChLCD panel 10 is greater than an error value after scanning the column circuit structures 11 and the row circuit structures 12 of the ChLCD panel 10. The signal processing unit 14 determines the pixels having the reflectivity greater than the error value to be the uneven pixels, then outputs a first driving signal to the liquid crystal driving unit 13, and the liquid crystal driving unit 13 outputs the non-addressing signals M times to the row circuit structures 12 of the uneven pixels to even out the reflectivity of the uneven pixels. In the embodiment, M is an integer greater than or equal to 1. Similarly, the signal processing unit 14 determines the pixels having the reflectivity smaller than the error value to be even pixels, outputs a second driving signal to the liquid crystal driving unit 13, and the liquid crystal driving unit 13 outputs open circuit voltage signals M times to the row circuit structure 12 of the even pixels, to maintain the reflectivity of the even pixels.

In one embodiment, each of the open circuit voltage signals is a high-impendence (Hi-Z) voltage signal. The Hi-Z voltage signal indicates stopping outputting the energy to the pixel. Moreover, for the pixel having the reflectivity smaller than the error value, because of the reflectivity located in an error value range, there is no need to apply energy to the pixels having the reflectivity smaller than the error value. Therefore, the liquid crystal driving unit 13 outputs a Hi-Z signal to stop outputting energy to the even pixels.

Additionally, the liquid crystal driving unit 13 includes a liquid crystal driving integrated circuit, and the liquid crystal driving integrated circuit includes multiple signal output pins. The signal output pins include VDM, VN3, VN2, VN1, VP1, VP2, VP3, and Hi-Z. The Hi-Z voltage signal is carried by one of the signal output pins. Furthermore, the Hi-Z voltage signal indicates disconnecting the voltage supply to the pixel from the liquid crystal driving unit 13, that is, in an open circuit state, the pixel on the ChLCD panel 10 won't be able to receive the energy from the liquid crystal driving unit 13.

With reference to FIG. 3, FIG. 3 is a schematic diagram of a row driving signal of a first embodiment of the driving method of the cholesteric liquid crystal display device of the present invention. In FIG. 3, the ChLCD panel 10 with a 16×16 array of the row circuit structures 12 and the column circuit structures 11 is used as an example. The horizontal axis with a Frame label refers to time or a number of times. The vertical axis refers to the row of the row circuit structures 12. The following embodiments use the number of times to represent the meaning of Frame. As shown in FIG. 3, the row driving signal is sequentially scanned from the first to the Y-th row circuit structures 12 of the row circuit structures 12, and the column driving signal is transmitted column by column from the first to the X-th column circuit structures 11 of the column circuit structures 11.

During the initial scan of the ChLCD panel 10, the liquid crystal driving unit 13 generates a first addressing signal to the first row circuit structure 12, and generates the non-addressing signals to the second to the sixteenth row circuit structures 12. During the second scan of the ChLCD panel 10, the liquid crystal driving unit 13 generates a second addressing signal to the second row circuit structure 12, and generates the non-addressing signals to the first row circuit structure 12, and the third to the sixteenth row circuit structures 12. By analogy, during the sixteenth scan of the ChLCD panel 10, the liquid crystal driving unit 13 generates a sixteenth addressing signal to the sixteenth row circuit structure 12, and the full screen scan of the ChLCD panel 10 is completed.

As stated above, the liquid crystal driving unit outputs the addressing signals to all sixteen rows of the row circuit structures 12, and during the thirteenth scan to the sixteenth scan of the ChLCD panel 10, there is no enough time to generate non-addressing signals to the thirteenth to the sixteenth row circuit structures 12. Therefore, in the embodiment, the ChLCD panel 10 is driven M additional times. M is four in this embodiment, and the additional times are the seventeenth time to the twentieth time. With the additional times driving the ChLCD panel 10, the liquid crystal driving unit 13 generates non-addressing signals to the thirteenth to the sixteenth row circuit structures 12, for the uneven pixels to obtain enough energy for compensation. On the other hand, the first to the twelfth row circuit structures 12 have obtained enough energy after multiple drives with non-addressing signals, so the pixels are considered as even pixels, therefore, the liquid crystal driving unit 13 outputs four Hi-Z voltage signals, to stop energy output to the pixels on the first to the twelfth row circuit structures 12.

In one embodiment, the number of times the non-addressing signals and the Hi-Z voltage signals are output, and the number of rows output to the row circuit structures 12, are not limited to this, but are preset by the manufacturer. In another embodiment, the number of times the non-addressing signals and the Hi-Z voltage signals are output, and the number of rows output to the row circuit structures 12, are not limited to this, but are determined by the error value of the reflectivity of the pixels. In the embodiment, the liquid crystal driving unit 13 evens out the pixel reflectivity by outputting the non-addressing signals and the open circuit voltage signals to the row circuit structures 12 with M times. Moreover, in the embodiment, the liquid crystal driving unit 13 generates the column driving signals, including the Hi-Z voltage signal and a greyscale voltage signal, to even out the reflectivity of the uneven pixels, and to maintain the reflectivity of the even pixels.

As stated above, the error value of the reflectivity of the pixels is stated by a precision of the ChLCD panel 10, where the precision is defined by a user. If the user wants to have the ChLCD device 1 with higher precision, for example, in a 5% error value range, then the liquid crystal driving unit 13 needs to output less rows and less times of non-addressing signals to the row circuit structures 12. In contrast, the liquid crystal driving unit 13 needs to output Hi-Z voltage signals to more rows of the row circuit structures 12.

If the user wants to have the ChLCD device 1 with lower precision, for example, in a 20% error value range, then the liquid crystal driving unit 13 needs to output more rows and more times of non-addressing signals to the row circuit structures 12. In contrast, the liquid crystal driving unit 13 needs to output Hi-Z voltage signals to less rows of the row circuit structures 12. The present invention does not limit the rows and the times of the Hi-Z voltage signal and the non-addressing signal being output to the row circuit structures 12.

With reference to FIG. 4, FIG. 4 is a schematic diagram of a row driving signal of a second embodiment of the driving method of the cholesteric liquid crystal display device of the present invention. In the embodiment, which is also based on outputting the Hi-Z voltage signal or the non-addressing signal with a fixed number of M times to the row circuit structures 12. In the embodiment, during the initial scan of the ChLCD panel 10, the liquid crystal driving unit 13 generates the first addressing signal to the first row circuit structure 12 of the row circuit structures 12, and generates the non-addressing signals to the second to the sixteenth row circuit structures 12 of the row circuit structures 12. During the second scan of the ChLCD panel 10, the liquid crystal driving unit 13 generates the second addressing signal to the second row circuit structure 12 of the row circuit structures 12, generates the non-addressing signals to the first row circuit structure 12, and the third to the sixteenth row circuit structures 12 of the row circuit structures 12. In the embodiment, the liquid crystal driving unit 13 outputs M times of non-addressing signals to each row of the row circuit structures 12. M is four in this embodiment.

Taking the first row circuit structure 12 of the row circuit structures 12 as an example, the liquid crystal driving unit 13 generates the first addressing signal to the first row circuit structure 12 during the initial scan of the ChLCD panel 10, generates the non-addressing signals during the second scan to the fifth scan, and then generates the Hi-Z voltage signals during the sixth scan to the twentieth scan. Taking the second row circuit structure 12 of the row circuit structures 12 as another example, the liquid crystal driving unit 13 generates the non-addressing signal to the second row circuit structure 12 of the row circuit structures 12 during the initial scan of the ChLCD panel 10, generates the second addressing signal during the second scan, generates the non-addressing signals during the third scan to the sixth scan, and then generates the Hi-Z voltage signals during the seventh scan to the twentieth scan. Similarly, in the embodiment, the liquid crystal driving unit 13 evens out the reflectivity of the uneven pixels by fixing the number of outputting the non-addressing signals to the row circuit structures 12. In one embodiment, after the liquid crystal driving unit 13 outputs the addressing signals to the row circuit structures of the even pixels, the liquid crystal driving unit 13 evens out the reflectivity of the pixel with further outputting the non-addressing signals M times to the row circuit structures of the even pixels, and then outputting the open circuit voltage signals to the row circuit structures of the even pixels. M is preset by the manufacturer.

In another embodiment, the liquid crystal driving unit 13 evens out the reflectivity of the pixels based on the precision of the ChLCD panel 10, where the precision is based on the error value of the reflectivity of the pixels, by fixing the number of times outputting the non-addressing signals and the open circuit voltage signals to the row circuit structures 12.

Based on the above, the cholesteric liquid crystal device and the driving method thereof can adjust the number of times of outputting the non-addressing signals to the row circuit structures 12 based on the precision of the requirements of the ChLCD device 1, that is, depending on a need of the error value of the reflectivity of the pixels. The cholesteric liquid crystal device and the driving method thereof can also adjust the number of outputting the non-addressing signals and open circuit voltage signal, to even out the reflectivity of the uneven pixels on the ChLCD panel 10. Therefore, each row circuit structure 12 of the ChLCD panel 10 can receive the same amount of the non-addressing signals, so that all cholesteric liquid crystals can obtain enough energy to switch states, in order to even the cholesteric liquid crystals.

What is claimed is:

1. A driving method for a cholesteric liquid crystal display (ChLCD) device, comprising:

generating column driving signals and row driving signals, outputting the column driving signals to X column circuit structures of a cholesteric liquid crystal display panel, and outputting the row driving signals to Y row circuit structures of the ChLCD panel by a liquid crystal driving unit; wherein the row driving signals include addressing and non-addressing signals; wherein each intersection crossed by each row circuit structure and each column circuit structure forms a respective pixel; wherein, the ChLCD panel comprises multiple uneven pixels and multiple even pixels;

wherein, after the liquid crystal driving unit outputs the addressing signals to the Y-th row circuit structure, the liquid crystal driving unit outputs the non-addressing signals at most M times to the row circuit structures of the uneven pixels to even out reflectivity of the uneven pixels; wherein, M is an integer greater than or equal to 1; and wherein, after the liquid crystal driving unit outputs the addressing signals to the Y-th row circuit structure, the liquid crystal driving unit outputs high-impedance (Hi-Z) voltage signals M times to the row circuit structures of the even pixels, to maintain the reflectivity of the even pixels.

2. The driving method for the cholesteric liquid crystal display device as claimed in claim 1, wherein, after the liquid crystal driving unit outputs the addressing signals to the Y-th row circuit structures, the liquid crystal driving unit outputs the addressing signals M times to the row circuit structures of the uneven pixels.

3. The driving method for the cholesteric liquid crystal display device as claimed in claim 1, wherein, after the liquid crystal driving unit outputs the addressing signals to the Y-th row circuit structure, and when the liquid crystal driving unit outputs the non-addressing signals less than M times, the liquid crystal driving unit further outputs the Hi-Z voltage signals to the row circuit structures of the uneven pixels;

wherein, the liquid crystal driving unit outputs a sum of M times of the non-addressing signals and the Hi-Z voltage signals to the row circuit structures of the uneven pixels.

4. The driving method for the cholesteric liquid crystal display device as claimed in claim 1, wherein after the liquid crystal driving unit outputs the addressing signals to the row circuit structures of the even pixels, the liquid crystal driving unit further outputs the non-addressing signals M times to the row circuit structures of the even pixels, and then outputs the Hi-Z voltage signals to the row circuit structures of the even pixels.

5. The driving method for the cholesteric liquid crystal display device as claimed in claim 1, wherein the column driving signals comprise the Hi-Z voltage signal or a greyscale voltage signal.

6. A cholesteric liquid crystal display (ChLCD) device, comprising:

a ChLCD panel, comprising X column circuit structures and Y row circuit structures, wherein each intersection crossed by each row circuit structure and each column circuit structure forms a respective pixel; wherein, the ChLCD panel comprises multiple uneven pixels and multiple even pixels;

a liquid crystal driving unit, connected to the ChLCD panel, generating row driving signals and column driving signals, outputting the column driving signals to the X column circuit structures of the ChLCD panel, and outputting the row driving signals to the Y row circuit structures of the ChLCD panel; wherein the row driving signals comprise addressing and non-addressing signals; and a signal processing unit, connected to the row circuit structures and the column circuit structures of the ChLCD panel, and the liquid crystal driving unit;

wherein, the liquid crystal driving unit outputs the non-addressing signals at most M times to the row circuit structures of the uneven pixels to even out reflectivity of the uneven pixels after the liquid crystal driving unit outputs the addressing signals to the Y-th row circuit structure; wherein, M is an integer greater than or equal to 1; and wherein, the liquid crystal driving unit outputs high-impedance (Hi-Z) voltage signals M times to the row circuit structures of the even pixels to maintain the reflectivity of the even pixels after the liquid crystal driving unit outputs the addressing signals to the Y-th row circuit structure.

7. The cholesteric liquid crystal display device as claimed in claim 6, wherein the liquid crystal driving unit outputs the addressing signals M times to the row circuit structures of the uneven pixels after the liquid crystal driving unit outputs the addressing signals to the Y-th row circuit structure.

8. The cholesteric liquid crystal display device as claimed in claim 6, wherein when the liquid crystal driving unit outputs the non-addressing signals less than M times, the liquid crystal driving unit further outputs the high-impedance (Hi-Z) voltage signals M times to the row circuit structures of the even pixels after the liquid crystal driving unit outputs the addressing signals to the Y-th row circuit structure.

9. The cholesteric liquid crystal display device as claimed in claim 6, wherein the liquid crystal driving unit further outputs the non-addressing signals M times to the row circuit structures of the even pixels, and then outputs the Hi-Z voltage signals to the row circuit structures of the even pixels after the liquid crystal driving unit outputs the addressing signals to the row circuit structures of the even pixels.

10. The cholesteric liquid crystal display device as claimed in claim 6, wherein the column driving signals comprise the Hi-Z voltage signal or a greyscale voltage signal.

* * * * *